United States Patent [19]

Pluenneke et al.

[11] 3,935,670

[45] Feb. 3, 1976

[54] APPARATUS FOR SELECTIVELY APPLYING ELECTRICAL CURRENT TO PLANTS

[75] Inventors: Ricks H. Pluenneke, Greenwood; Willis G. Dykes, Vicksburg, both of Miss.

[73] Assignee: Lasco Corporation, Greenwood, Miss.

[22] Filed: Nov. 1, 1974

[21] Appl. No.: 520,229

[52] U.S. Cl. ................................. 47/1.3; 17/1 E
[51] Int. Cl.² ........................................ A01M 21/00
[58] Field of Search ........... 17/1 E; 231/2 E; 47/1.3; 128/406

[56] References Cited
UNITED STATES PATENTS

| | | | |
|---|---|---|---|
| 1,140,365 | 5/1915 | Dixon | 231/2 E |
| 1,553,135 | 9/1925 | Byrnes | 17/1 E |
| 1,661,030 | 2/1928 | Burt | 47/1.3 |
| 2,007,383 | 7/1935 | Opp | 47/1.3 |
| 2,682,729 | 7/1954 | Poynor | 47/1.3 |
| 3,167,809 | 2/1965 | Rollins | 17/1 E |
| 3,196,877 | 7/1965 | Corbin | 128/406 |

*Primary Examiner*—Robert E. Bagwill
*Attorney, Agent, or Firm*—Cushman, Darby & Cushman

[57] ABSTRACT

Apparatus for destroying selected plants by the application of electricity thereto. A source of high-voltage electrical current is mounted on a moveable platform, and a grounding wheel or the like is provided for insuring safety of the apparatus by grounding various electrical source components. A conductive tip portion of a non-conductive staff member may be connected to the source of current by a cord, and an operator controlled switch in a secondary control circuit is mounted on the staff member. The switch is normally open so that the conductive tip portion will not be energized should the operator release his grip on the staff member. By actuating the switch and bringing the tip portion into mere touching engagement with a plant stem, plant destruction may be effected.

2 Claims, 5 Drawing Figures

APPARATUS FOR SELECTIVELY APPLYING ELECTRICAL CURRENT TO PLANTS

BACKGROUND AND SUMMARY OF THE INVENTION

The invention relates in general to apparatus for killing weeds and thinning crops, and in particular to apparatus for facilitating selective application of an electrical current to individual plants to be killed. Some prior art proposals have suggested the selective application of electricity to plants to be killed by utilizing a hand-held device, however for various reasons such proposals have not been commercially successfull. U.S. Pat. No. 1,661,030 for example suggests the use of a conductive knife blade on an elongated pole, attached to an AC electrical source with grounding poles, for facilitating plant destruction by cutting and supplying a current thereto. Such a device is impractical to operate and unsafe, however, since it does not allow an operator complete freedom of movement and requires an operator to handle a member that is continuously charged, and requires the operator to perform a cutting motion.

According to the present invention, apparatus is provided for allowing selective destruction of plants without the safety hazards present in prior art devices, and with complete freedom of movement. A source of high-voltage, high-amperage electrical current (AC or DC) is mounted on a vehicle adapted to traverse a field where weeds are to be killed and/or crops to be thinned. Electrically connected with the current source are one or more members adapted to be held by an operator and for selectively applying current from said source to a plant to be destroyed. The member includes a "stick" portion of non-conductive material, and a tip portion of conductive material. An operator controlled switch is mounted on the stick portion for selectively making and breaking the electrical path between the current source and the conductive tip portion. The switch is in a low-voltage secondary control circuit for controlling the high-voltage circuit. Ground contact for the vehicle on which the current source is mounted is provided by a sharpened wheel or chain or the like which provides ground contact as the vehicle is moving and does not require the operator to remove and reinsert grounding poles from and into the ground when it is necessary to change the range of the device. Plant destruction is effected by merely bringing the conductive tip portion into contact with a plant. Safety interlock means for the electrical equipment may also be provided.

DETAILED DESCRIPTION OF THE INVENTION

Figure 1:
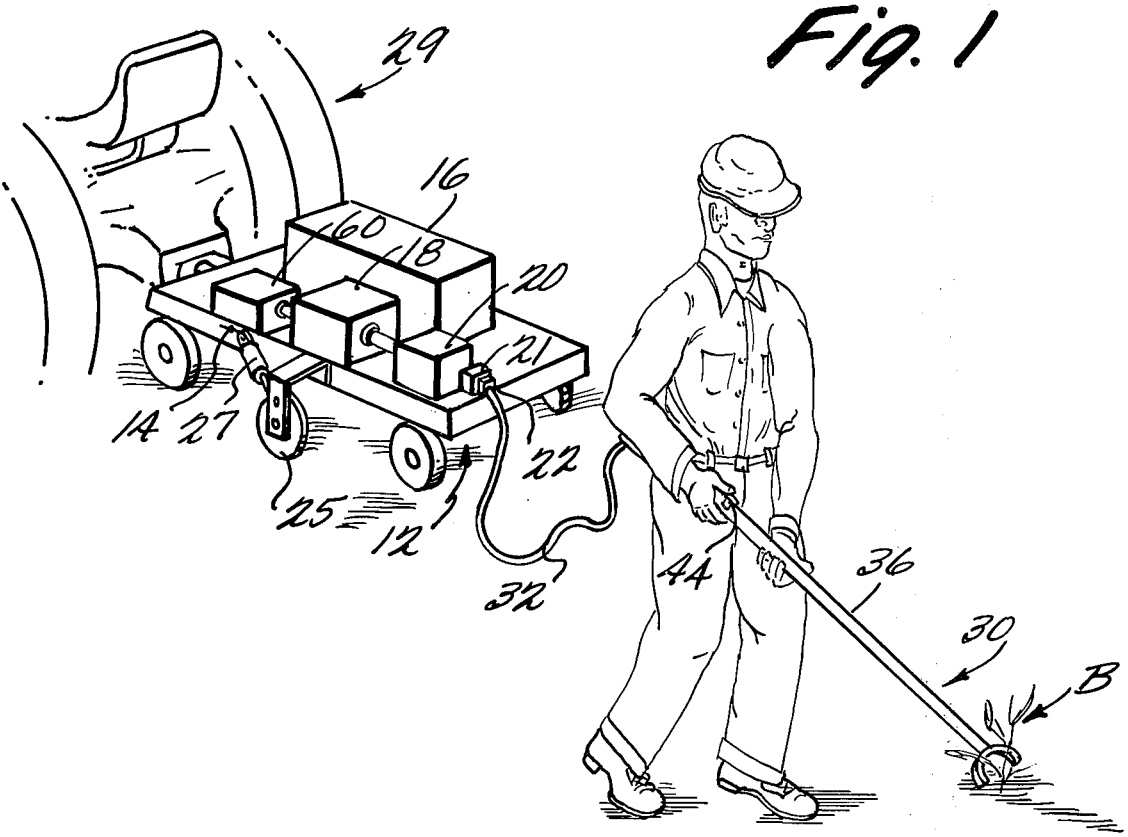
FIG. 1 is a perspective view of exemplary apparatus according to the invention in use.

Apparatus for supplying electrical current for killing plants is shown generally at 12 in FIG. 1. This apparatus may include a wheeled platform 14 or the like mounting a generator 16, a transformer 18, a capacitor 20, or other suitable equipment for generating a high-voltage, high-amperage electrical current, and a control box 21 for making-and-breaking a high-voltage line 33 of the assembly. The current to be generated may be either AC or DC, depending upon the equipment that is most readily available. At the end of the control box 21 is an electrical connection 22 or the like for facilitating a readily detachable connection of a power transmitting cable 32 to the assembly 12.

Figure 3A:
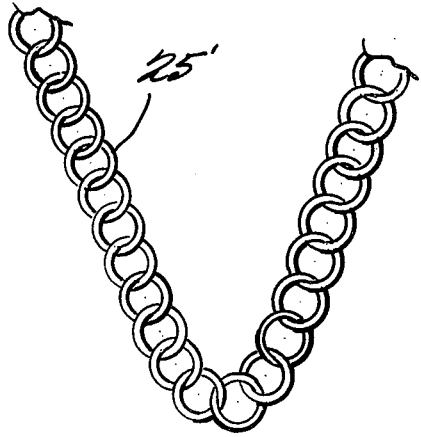
FIGS. 3a and 3b are modifications of grounding means that may be used with the apparatus of FIGS. 1 and 2.
Figure 3B:
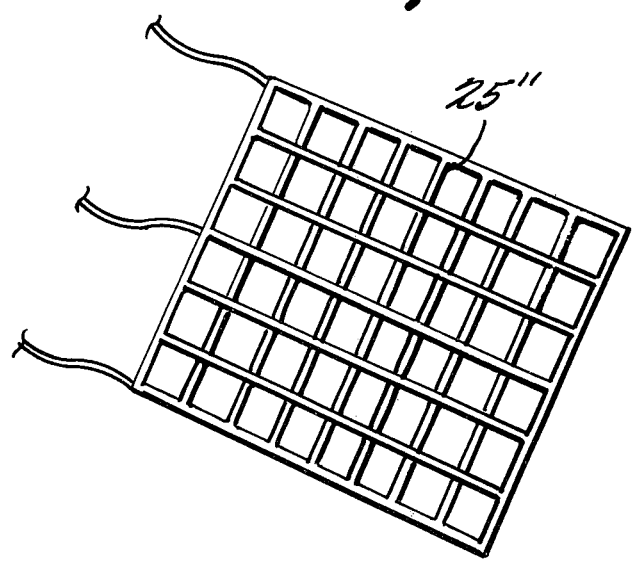
Figure 2:
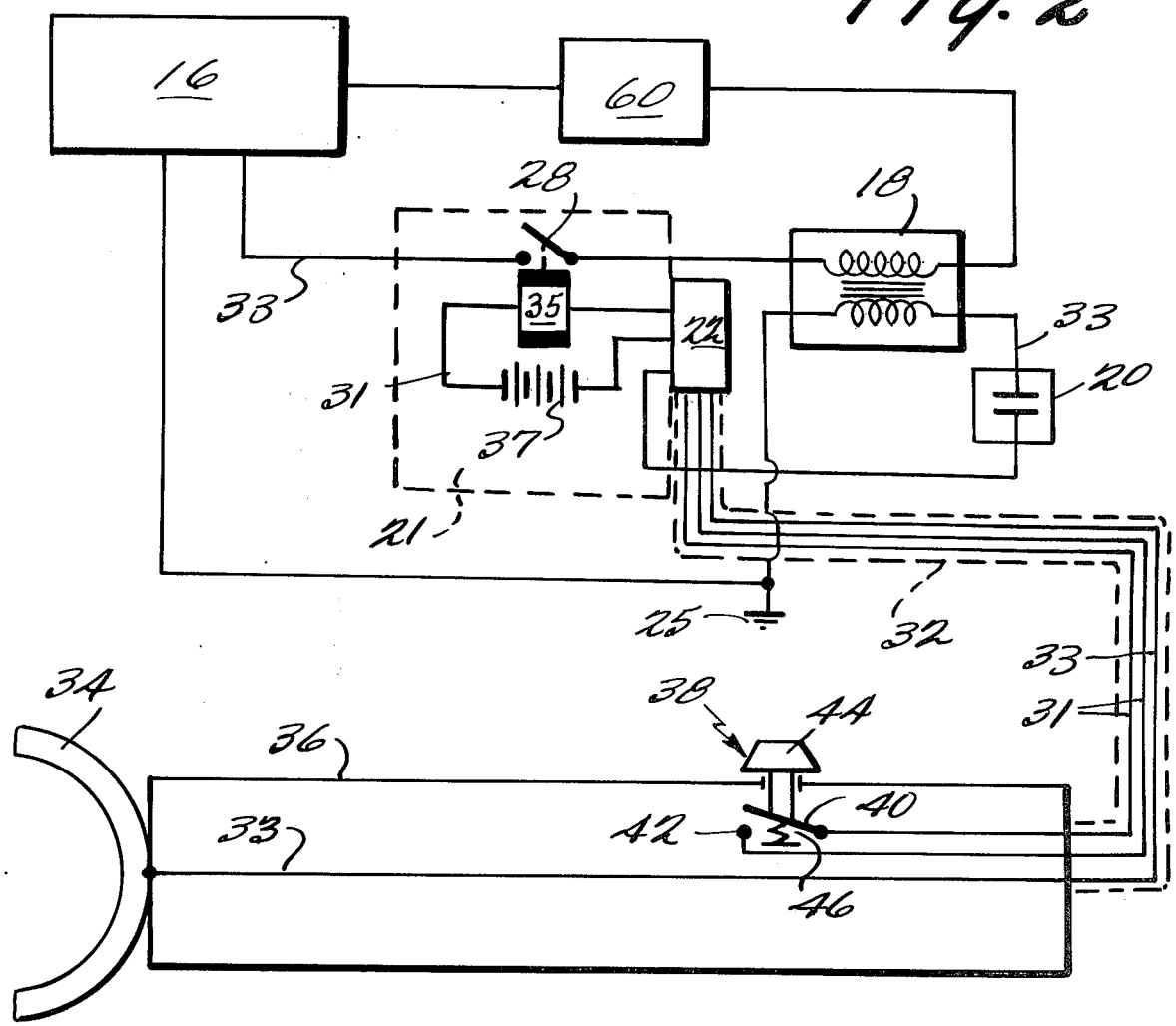
FIG. 2 is a diagrammatic view of exemplary circuitry that may be employed.

Ground for the electrical equipment mounted on the platform 14 may be provided by a sharpened wheel 25 of conductive material, electrically connected to the generator and transformer as shown in FIG. 2. The vertical position of the safety ground wheel 25 can be adjusted by any suitable manual or automatic raising and lowering means, such as hydraulic cylinder 27. Other suitable grounding devices could also be provided as long as they provide continuous grounding of the electrical equipment during movement of the platform without requiring the device to be stopped to remove and re-insert grounds. Examples of other suitable grounding means are shown in FIGS. 3a and 3b, wherein 25' comprises a simple heavy conductive chain and 25'' comprises a mesh of chains. Care must be taken, of course, to insure that while good ground contact is provided, the grounding means will not be so large and cumbersome that it will be impossible to avoid the killing of desired plants therewith while the platform 14 is powered along its path of movement.

The platform 14 may be powered by any suitable means such as a self-contained motor assembly, or a separate towing vehicle such as tractor 29. Likewise the generator 16 may be powered by a power takeoff from the engine of tractor 29, or by a separate motor assembly.

Apparatus according to the invention for selectively applying electrical current from the electrical assembly 12 to plants to be killed is shown generally at 30 in the drawings. This apparatus 30 includes a high-voltage wire 33 passing through an insulated cable 32 connected from connection 22 to a conductive plant engaging member 34. The plant engaging member may be of any suitable construction which will allow contact with a plant B. As shown in the drawings, the member 34 is in the shape of a half-circle, which allows precise positioning of the current supplying portion while providing a sufficiently large area of contact. No cutting edge on the member 34 is required since mere contact with a plant stem therewith will result in plant destruction.

The conductive member 34 is formed as a tip portion on a tubular staff 36 or the like formed of non-conductive material and adapted to be grasped and manipulated by an operator as shown in FIG. 1. A switch assembly, shown generally at 38, is interposed in a secondary low-voltage control circuit 31 to selectively make-and-break the connection between the assembly 12 and the member 34 in control box 21. Any suitable control means can be provided to interrupt high-voltage line 33 in control box 21, such as a normally open bridging contact 28 operated by solenoid 35 in low-voltage circuit 31, and powered by any emf source 37 (such as a 24 volt battery). The leads of circuit 31 are also passed through cable 32 to the assembly 30. The control box 21 may be located in any suitable spot within high-voltage circuit 33, such as between the generator 16 and transformer 18 as shown in FIG. 2. It will be seen that the provision of a low-voltage control circuit 31 means that the operator will always be removed from the high-voltage circuit, and that a suitable small switch assembly 38 may be incorporated in the hand-held device 36.

Any suitable manually operated electrical switch 38 may be utilized, however, as shown in the drawings it is preferred to use a switch that is normally open so that should the operator ever accidently drop the staff 36, the member 34 cannot be energized, and subsequent potential damage to desirable plants or to the operator will be avoided.

As shown in FIG. 2 the switch 38 may comprise a movable contact 40 adapted to be moved into engagement with a stationary contact 42, or a bridging contact may be provided. A non-conductive pushbutton operator 44 or the like is operatively connected to the movable contact 40 for selectively bringing it into engagement with the contact 42 against the bias of the spring 46 to complete the current path in circuit 31 from emf source 31 to coil 35. Of course other operating means could be provided, such as a toggle or slide operator (although a pushbutton is preferred because of durability and the ease of providing a normally open bias therewith), and releaseable latching means could also be provided to allow for maintainence of the swtich contacts 40, 42 in their engaged position.

Figure 4:
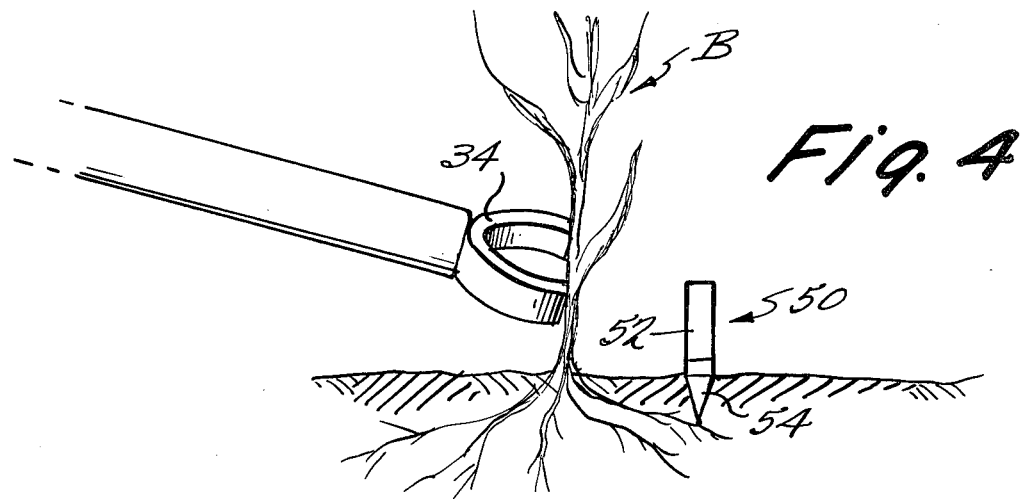
FIG. 4 is a view partly in section and partly in elevation of an electrode for facilitating the killing of perennials that may be utilized with the apparatus of FIG. 1.

A device that may be used where the plants to be killed are perennials with extensive root systems, such as Johnson grass, is the electrode 50 shown in FIG. 4. This electrode simply comprises a non-conductive portion 52 adapted to extend out of the ground, and a conductive tapered tip portion 54 approximately 6–10 inches in length adapted to be inserted into the ground in contact with the root system of a plant B to be killed. When used in conjunction with the member 30, the electrode 50 assists drawing of the current down through the extensive root system of the plant B to facilitate destruction thereof. For most plants, however, such a device is not needed as the member 30 will supply sufficient current to kill the target plant by mere touching of the plant stem with the portion 34.

To provide for further safety in operating the apparatus according to the invention, a plurality of electrical interlocks may be provided for the assembly 12. These interlocks may include means responsive to the position of a cover for the transformer 18 or generator 16, means responsive to a good ground contact provided by the wheel 25 (or chains 25' and 25''), or a vehicle speed responsive means. Such means are shown schematically in the electrical circuitry at 60 in the drawings, and may be of any suitable form for interrupting the supply of electricity to the assembly 30 under particular conditions.

Although the apparatus has been described with reference to only one electrical outlet 22 and one assembly 30, a plurality of such means may be provided so that more than one operator may be killing plants at the same time with the same generating equipment.

The invention now having been set forth, a typical operation thereof will now be described: A cable 32 of a member 30 containing leads for low-voltage circuit 31 and high-voltage circuit 33 is attached to electrical connection 22 of control box 21 of electrical assembly 12, and platform 14 is moved out into a field where weeds are to be killed or crops are to be thinned. As the platform moves along in the field, continuous electrical ground connection is provided for the assembly 12 by grounding wheel 25 or the like. An operator holding staff 36 of member 30 is free to roam around the field to the extent of the cord 32 length away from the platform 14 and selectively bring the conductive tip portion 34 of member 30 into engagement with plants that it is desired to kill. No cutting action is required. The pushbutton 44 of switch 38 is depressed when contact is made with a plant B whereby contactor 28 is closed and electrical current is transferred from the assembly 12 through high-voltage line 33 through the plant B to the root system, in order to insure destruction of the root system as well as the stem and leaves of the plant, an electrode 50 or the like is inserted into the ground in proximate engagement with the root system of the plant B. The electrode 50 may be removed as soon as the current is passed through the plant.

While the invention has been herein shown and described for use in weed-killing and crop-thinning, it will also be appreciated that it may be used for defoliation of crops. It has been demonstrated that with certain plants (i.e. the legume, *Sesbania exahata L.*) by using a lesser current than is necessary for the killing of the plant, defoliation will be induced within 14 days after treatment.

It will thus be seen that apparatus, including a plant engaging member, has been herein disclosed and described that provides for ready destruction of selected plants with complete freedom of movement by an operator while complete safety of the operator is insured, and that does not require a cutting movement of the plant engaging member by the operator. While the invention has been herein shown and described in what is presently conceived to be the most practical and preferred embodiment, it will be obvious to one of ordinary skill in the art that many modifications may be made thereof within the scope of the invention, which scope is not to be limited except by the appended claims.

What is claimed is:
1. Apparatus for selectively destroying plants by the application of electrical current thereto, comprising
   a. a source of high-voltage electrical current,
   b. movable means for mounting said source of electrical current for movement,
   c. safety grounding means for providing continuous grounding of said source of electrical current during movement thereof, said grounding means comprising a sharpened electrically conductive wheel attached to said movable means, and means being provided for selectively moving said wheel into and out of ground engagement,
   d. means for transferring electrical current from said source to selective plants to be destroyed, said means including (i) a non-conductive staff member adapted to be grasped by an operator, (ii) a single semi-circularly shaped dull-edged conductive member operatively attached to said staff member and adapted to be brought into engagement with plants to be destroyed, (iii) a high-voltage circuit adapted to connect said conductive member to said source of electrical current, (iv) a normally spring-biased open first electrical switch interposed in said high-voltage circuit, (v) means for selectively closing said first electrical switch against said spring bias, said means including a low-voltage control circuit and a spring-biased open sound electrical switch disposed in said low voltage control circuit, said second electric switch having an actuator mounted on said non-conductive staff member.

2. Apparatus as recited in claim 1 further comprising an electrode having a non-conductive portion and a conductive portion adapted to be inserted into the ground proximate to a plant root system to facilitate passage of electrical current from said electrical current transferring means conductive member through the plant root system.

* * * * *